United States Patent [19]

Oka

[11] Patent Number: 5,487,047
[45] Date of Patent: Jan. 23, 1996

[54] MAGNETOOPTICAL RECORDING APPARATUS FOR RECORDING INFORMATION IN A LEAD-IN REGION OF A RECORDING MEDIUM

[75] Inventor: Nobuyuki Oka, Kanagawa, Japan

[73] Assignee: Sony Corporation, Tokyo, Japan

[21] Appl. No.: 50,536

[22] Filed: Apr. 20, 1993

[30] Foreign Application Priority Data

Apr. 24, 1992 [JP] Japan .................................. 4-131884

[51] Int. Cl.$^6$ .............................. G11B 17/22; G11B 7/00
[52] U.S. Cl. .................................. 369/32; 369/33; 369/47
[58] Field of Search .................................. 369/13, 32, 83, 369/47, 33, 30, 56, 58, 59, 44.26, 275.3, 48, 54; 360/8, 32

[56] References Cited

U.S. PATENT DOCUMENTS

| | | | |
|---|---|---|---|
| 5,153,861 | 10/1992 | Maeda et al. | 369/32 |
| 5,343,452 | 8/1994 | Maeda et al. | 369/32 |

FOREIGN PATENT DOCUMENTS

| | | |
|---|---|---|
| 0281415 | 9/1988 | European Pat. Off. . |
| 0346979 | 12/1989 | European Pat. Off. . |
| 0406021A3 | 1/1991 | European Pat. Off. . |
| 0473305 | 3/1992 | European Pat. Off. . |
| 0540164 | 5/1993 | European Pat. Off. . |

Primary Examiner—Ali Neyzari
Attorney, Agent, or Firm—Limbach & Limbach

[57] ABSTRACT

A magnetooptical recording apparatus records data in a recording region of a magnetooptical recording medium. Information representing the contents of the data recorded in the recording region is recorded in a lead-in region of the magnetooptical recording medium. The magnetooptical recording apparatus includes a recording head unit, a timer and a system controller. The recording head unit records data processed by a specified signal processing procedure on the magnetooptical recording medium. The timer measures elapsed time from the start of a recording operation of the recording head unit. The system controller interrupts the recording operation of the recording head unit. The system controller interrupts the recording operation of the recording head unit temporarily when the recording time measured by the timer coincides with a predetermined time, moves the recording head unit to the lead-in region of the magnetooptical recording medium, and controls the recording head unit to record information representing the contents of the data recorded in the recording region of the magnetooptical recording medium.

4 Claims, 2 Drawing Sheets

MAGNETOOPTICAL RECORDING APPARATUS FOR RECORDING INFORMATION IN A LEAD-IN REGION OF A RECORDING MEDIUM

BACKGROUND OF THE INVENTION

1. Field of the Invention

The present invention relates to a recording apparatus for recording information on a magnetooptical recording medium. More particularly, the present invention relates to a magnetooptical recording apparatus for recording music data on a magnetooptical recording medium.

2. Background of the Invention

A first type of known magnetooptical recording apparatus for recording information on a magnetooptical recording medium having a data region and a lead-in region, in general, records digital data in the data region. When recording digital music data or the like in the data region of the magnetooptical recording medium, a system controller produces what is called TOC (table of contents) data concerning the digital data, including tune number (track number) and time data representing recording start time and recording time, on the basis of the digital data to be recorded on the magnetooptical recording medium. The TOC information produced by the system controller is stored in a storage device such as a DRAM or the like. Upon completion of digital data recording in the data region of the magnetooptical recording medium, the recording head is shifted from the data region to the lead-in region, and then the TOC information stored in the storage device is recorded in the lead-in region of the magnetooptical recording medium. Such a magnetooptical recording apparatus is disclosed in, for example, Japanese Patent Laid-Open (Kokai) No. 4-119551.

A second type of known magnetooptical recording apparatus, when recording digital data on a magnetooptical recording medium having a data region carrying digital data, interrupts the recording operation at a specified time upon detection of a change in the TOC information representing the contents of the recorded digital data. Then, the magnetooptical recording apparatus, similarly to the first known magnetooptical recording apparatus, records the TOC information previously stored in the lead-in region of the storage device, and resumes the recording operation.

A third type of known magnetooptical recording apparatus, similarly to the second type of known magnetooptical recording apparatus, interrupts the recording operation for recording digital data in the recording region when the amount of TOC information, representing the contents of the digital data recorded in the data region of the magnetooptical recording medium, reaches a specified information content, and then shifts the recording head to the lead-in region to record the TOC information previously stored in the storage device in the lead-in region of the magnetooptical recording medium. Upon completion of the recording of TOC information in the lead-in region, the recording head is shifted to the data region to resume recording of the digital data in the recording region.

When the first type of known magnetooptical recording apparatus employing a DRAM is disconnected from the power supply, a backup device, such as a capacitor, is capable of supplying power for only a very short time. If a static RAM is employed instead of the DRAM, the magnetooptical recording apparatus needs a large scale circuit, which increases the cost of the magnetooptical recording apparatus.

The second type of known magnetooptical recording apparatus needs to record the TOC information every time the TOC information changes. Accordingly, the recording head moving mechanism for shifting the recording head, such as an optical pickup, needs to operate frequently when recording a large number of musical pieces. Consequently, the load on the recording head moving mechanism is increased and the recording operation needs to be interrupted frequently during operation of the recording head moving mechanism.

The third type of known magnetooptical recording apparatus records TOC information in the lead-in region every time the amount of TOC information reaches a specified information content. Since the amount of TOC information reaches the specified information content in a short time when recording a large number of musical pieces, the same problem as resides in the second type of known magnetooptical recording apparatus arises.

When recording a small number of musical pieces having a relatively large amount of data to be recorded, the time in which the amount of TOC information reaches the specified information content is relatively long. Therefore, if power supply to the magnetooptical recording apparatus is accidentally interrupted due to power failure, etc., all the TOC information stored in the storage device, such as a RAM, will be lost.

SUMMARY OF THE INVENTION

Accordingly, it is an object of the present invention to provide a magnetooptical recording apparatus which solves the foregoing problems of the prior art magnetooptical recording apparatuses.

Another object of the present invention is to provide a magnetooptical recording apparatus capable of limiting the possibility of loss of information to be recorded in the lead-in region of a magnetooptical recording medium.

A magnetooptical recording apparatus according to the present invention has a recording head, a timer and a controller, and records data and information representing the contents of the data respectively in the recording region and lead-in region of a magnetooptical recording medium. The recording head records the data processed by a predetermined signal processing procedure on the magnetooptical recording medium, the timer measures the time elapsed after the recording operation has started, and the controller so controls the recording head that the recording head interrupts the recording operation temporarily when the time for which the timer is set has elapsed, the recording head is shifted to the lead-in region of the magnetooptical recording medium, and the recording head records information representing the contents of the data recorded in the recording region of the magnetooptical recording medium.

Thus, the magnetooptical recording apparatus according to the present invention interrupts the recording operation temporarily every time the time for which the timer is set has elapsed, and records the information representing the contents of the data recorded in the recording region of the magnetooptical recording medium in the lead-in region. Accordingly, the possibility of loss of the information representing the contents of the data recorded in the recording region to be recorded in the lead-in region is minimized even if power supply to the magnetooptical recording apparatus is accidentally interrupted due to power failure or the like.

BRIEF DESCRIPTION OF THE DRAWINGS

The above and other objects, features and advantages of the present invention will become more apparent from the following description given in conjunction with the accompanying drawings, in which.

DETAILED DESCRIPTION OF THE PREFERRED EMBODIMENTS

Figure 1:
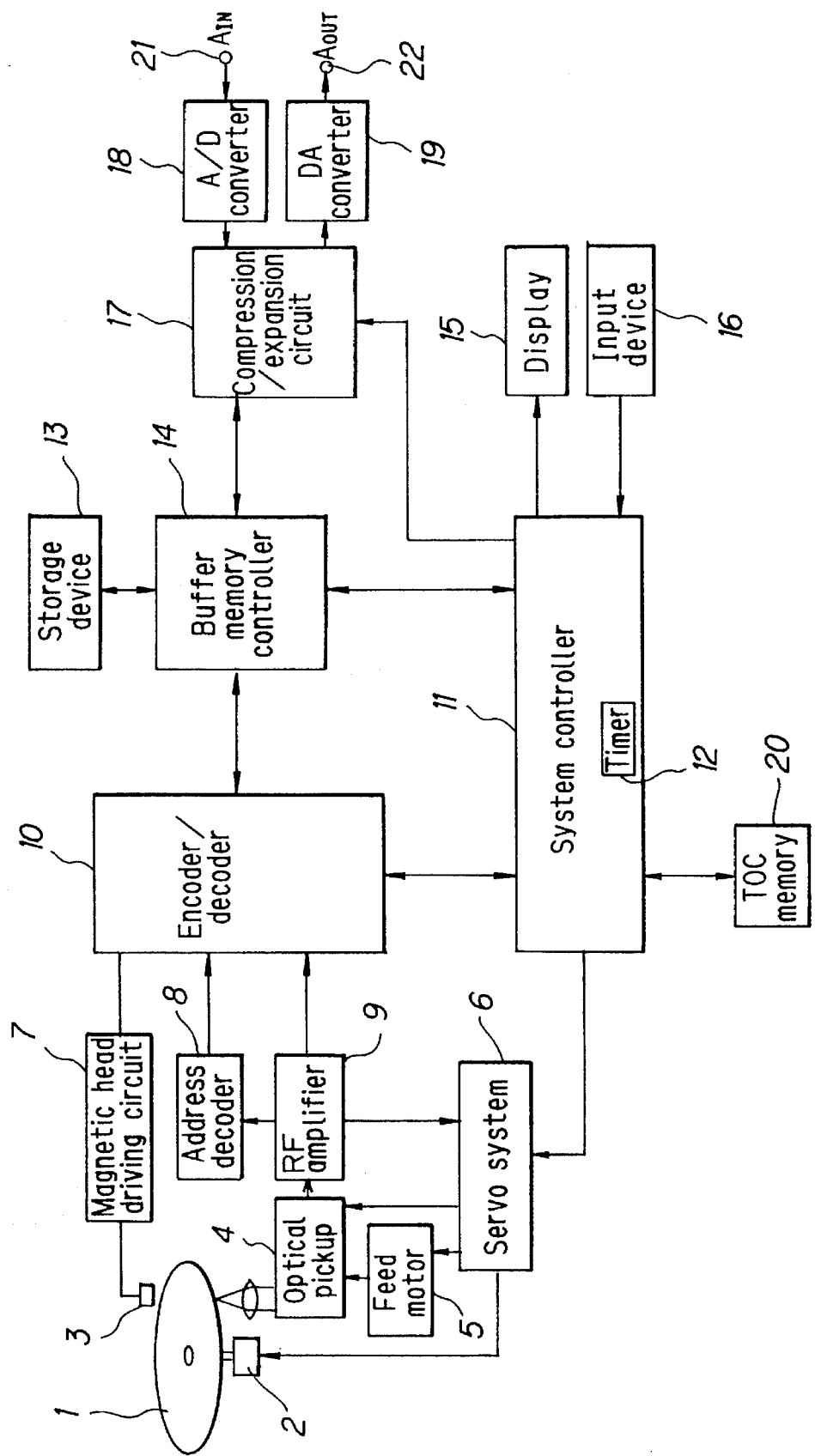
FIG. 1 is a block diagram of a magnetooptical recording apparatus in a preferred embodiment according to the present invention.

Referring to FIG. 1, a magnetooptical disk 1, i.e., a magnetooptical recording medium, comprises a transparent substrate having a disk shape, a magnetooptical recording film formed over the surface of the substrate, and a protective film covering the magnetooptical recording film. A portion of the magnetooptical recording film is heated to the Curie point with a recording light beam, and a modulated magnetic field is applied to the heated portion to record information therein. The magnetooptical disk 1 has a data region, i.e., a recording region in which information is recorded, and a lead-in region surrounded by the data region. The magnetooptical disk 1 is provided with a pregroove and address data for guiding the recording light beam, and is rotated by a spindle motor 2 at a fixed linear velocity. A magnetic head 3 is disposed on the side of the magnetooptical recording film of the magnetooptical disk 1 to apply vertical magnetic fields to the magnetooptical disk 1 in accordance with the information to be recorded. An optical pickup 4, which is disposed on the opposite side of the magnetooptical disk 1 to the magnetic head 3, is moved radially across the magnetooptical disk 1 by a shifting motor 5, and together with the magnetic head 3 to irradiate the magnetooptical disk with a light beam. A servo system 6 generates error signals, including a focusing error signal and a tracking error signal, on the basis of the output signals of an RF amplifier 9, which will be described later. Servo signals provided by the servo system 6 are sent to the spindle motor 2, the optical pickup 4 and the shifting motor 5. A magnetic head driving circuit 7 produces a driving signal according to the information to be recorded, to drive the magnetic head 3. The RF amplifier 9 amplifies the output signal of the optical pickup 4. An address decoder 8 extracts address information from the RF signal output by the RF amplifier 9 and gives the address information to an encoder/decoder 10.

The encoder/decoder 10 modulates digital data provided by a memory controller 14, which will be described later, by eight-to-fourteen modulation (EFM), and demodulates signals provided by the RF amplifier 9 by EFM. Furthermore, the encoder/decoder 10 encodes and decodes input data or input signals by means of the CIRC encoding/decoding process. A buffer memory 13 temporarily stores digital data supplied thereto through a buffer memory controller 14, which will be described later. The buffer memory 13 is, for example, a DRAM (dynamic random access memory) of 1 Mb capacity. The buffer memory controller 14 controls the operation for writing the output digital data of a compression/expansion circuit 17, which will be described later, in the buffer memory 13, and the operation for reading the stored digital data from the buffer memory 13. A TOC memory 20 stores TOC information representing the contents of the digital data recorded in the recording region.

When reproducing the recorded digital data, the TOC information is read from the lead-in region of the magnetooptical disk 1 in the TOC memory 20. When recording information in the magnetooptical disk 1 by the magnetooptical recording apparatus of the present invention, the TOC information is generated by a system controller 11, which will be described below. The TOC information need not necessarily be generated by the system controller 11, but may also be produced by another circuit.

The system controller 11 controls the respective operations of the servo system 6, the encoder/decoder 10, the buffer memory 13 and the compression-expansion circuit 17. A timer 12 starts measuring the recording time as soon as the magnetic head 3 and the optical pickup 4 have started their respective operations for recording data in the magnetooptical disk 1, and when the recording time which the timer 12 measures coincides with a predetermined time, provides a signal to that effect. The timer 12 comprises, for example, a reference clock generating circuit and a counter circuit. The reference clock generating circuit starts generating a clock signal as soon as the magnetic head 3 and the optical pickup 4 have started the recording operation to record information in the magnetooptical disk 1 and stops generating the clock signal when the recording operation is interrupted or completed. The counter circuit starts counting pulses of the clock signal at the start of the recording operation. Upon coincidence of the number of counted pulses of the clock signal with a predetermined value, the counter circuit supplies a signal to the system controller 11 then the counter circuit is reset. The timer 12 may be included in the system controller 11 as shown in FIG. 1 or may be a separate circuit.

A display 15, such as a LCD (liquid crystal display) is controlled by the output signal of the system controller 11 to display a track number, time and the like represented by the output signal of the encoder/decoder 10. An input device 16 is provided with a plurality of keys including are producing key, a recording key and a stop key, which are operated by the operator to give command signals to the system controller 11 for recording, reproducing and searching.

The compression/expansion circuit 17 compresses the output digital signal of an A/D converter 18 (analog-to-digital converter), which will be described later, and expands the digital data supplied through the buffer memory controller 14 to the buffer memory 13 for temporary storage then read out from the buffer memory 13. The A/D converter 18 converts an analog signal $A_{in}$, such as an audio signal received at its input terminal 21, into a corresponding digital signal and supplies the digital signal to the compression/expansion circuit 17. A D/A converter 19 (digital-to-analog converter) converts the output digital signal of the compression/expansion circuit 17 into a corresponding analog signal $A_{out}$, i.e., an audio signal, and outputs the analog signal $A_{out}$ through an output terminal 22 thereof.

The optical pickup 4 is provided with an optical system, not shown, comprising a laser light source, an objective lens, an optical detector and an actuator (not shown). The objective lens focuses the light beam emitted by the laser light source on the recording film of the magnetooptical disk 1. The objective lens is moved by the actuator in a focusing direction and a tracking direction according, to a focusing error signal and tracking error signal.

The light beam reflected by the recording film of the magnetooptical disk 1 is separated from the irradiating light beam emitted by the laser light source by the optical system and is detected by the optical detector. The output signal of the optical detector is supplied to the RF amplifier 9.

The operation of the magnetooptical recording apparatus will be described hereinafter.

When recording analog signals $A_{in}$, such as audio signals, on the magnetooptical disk 1, the input device 16 is operated to set the magnetooptical recording apparatus in recording mode. The analog signals $A_{in}$ applied to the input terminal 21 of the A/D converter 18 are converted into corresponding digital signals at a transmission rate of 11.4 Mb/sec by the A/D converter 18. The digital signals provided at a transmission rate of 1.4 Mb/sec by the A/D converter are compressed by the compression/expansion circuit 17 to provide digital signals at a transmission rate of 300 kb/sec. Then, the compressed digital signals are written continuously into the buffer memory 13 according to a write control signal provided by the buffer memory controller 14 until the number of bits stored in the buffer memory 13 reaches a predetermined capacity of, for example, 1 Mb. The digital signals written in the buffer memory 13 are read out in burst mode at a transmission rate of 1.4 Mb/sec from the buffer memory 13 according to a read control signal provided by the buffer memory controller 14. When reading the digital signals from the buffer memory in burst mode, a sequence of signals regarded as a unit is read discretely or discontinuously from the buffer memory 13. Immediately after the completion of the reading out of digital signals from the buffer memory 13, digital signals compressed by the compression/expansion circuit 17 are written into the buffer memory 13. After the digital signals read out from the buffer memory 13 in burst mode are recorded on the magnetooptical disk 1, the next digital signals are written in the buffer memory 13 in burst mode.

The digital signals read out from the buffer memory 13 are supplied to the encoder/decoder 10 for address data addition, and EFM and CIRC processing. Digital data provided by the encoder/decoder 10 is supplied to the magnetic head driving circuit 7, which in turn supplies modulating signals to the magnetic head 3. Meanwhile, the system controller 11 outputs a control signal to the servo system 6 to shift the optical pickup 4 to the recording start position in the data region of the magnetooptical disk 1, by driving the shifting motor 5. As the optical pickup 4 is moved, the magnetic head 3 moves radially across the magnetooptical disk 1 together with the optical pickup 4. The optical pickup 4 irradiates the magnetooptical disk 1 with a light beam, the optical detector of the optical pickup 4 detects the reflected light beam reflected by the magnetooptical disk 1, and the RF amplifier 9 amplifies the output signal of the optical pickup 4. The servo system 6 generates error signals including a focus error signal and a tracking error signal on the basis of the output signal of the optical pickup 4, then servocontrol of the spindle motor 2, the optical pickup 4 and the shifting motor 5 is executed according to these error signals. The magnetic head 3 applies a vertical magnetic field to the recording film of the magnetooptical disk 1 while the optical pickup 4 irradiates the recording film of the magnetooptical disk 1 with a light beam of a recording power level to record information on the recording film of the magnetooptical disk 1.

When recording the digital data provided by the encoder/decoder 10 on the magnetooptical disk 1, the system controller 11 controls the TOC information including the track number of a track on the magnetooptical disk 1 on which the digital data is to be recorded, the recording start time and the recording end time. The TOC information is updated continually and the updated TOC information is stored in the TOC memory 20. The display 15 displays the track number of a track on which the digital data is to be recorded and time elapsed, according to the output signal of the system controller 11.

Figure 2:
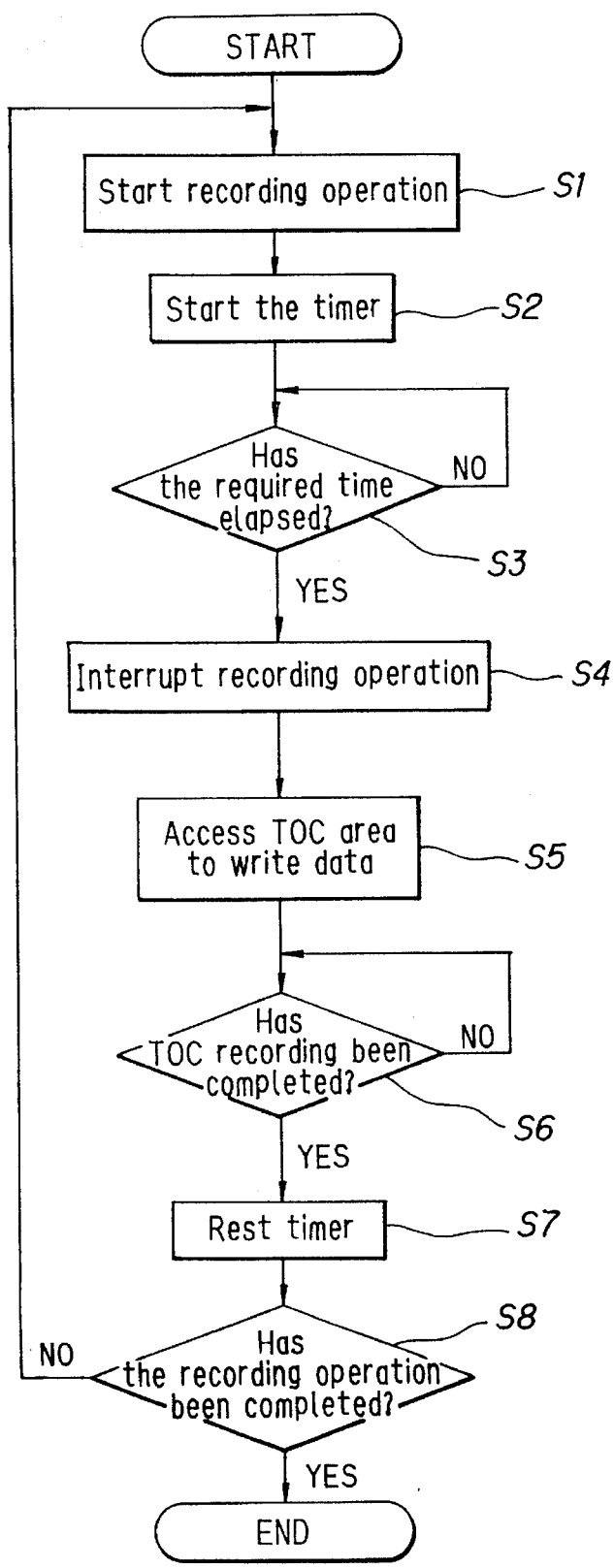
FIG. 2 is a flow chart showing the steps of operation of the magnetooptical recording apparatus of FIG. 1.

The system controller 11 controls the respective operations of the components of the magnetooptical recording apparatus by a procedure shown in the flow chart of FIG. 2. Upon initiation of the recording operation, the system controller 11 starts the timer 12 in step S1, and the timer 12 starts measuring the recording time in step S2. For example, at the moment when the reference clock generating circuit of the timer 12 starts generating the clock signal, the counter circuit starts counting pulses of the clock signal. The system controller 11 monitors the timer 12 to see if a predetermined time, for example, ten minutes, has elapsed; that is, the system controller 11 monitors the counter circuit of the timer 12 to see if the count of the counter circuit is equal to the predetermined value. The counter circuit supplies a signal to the system controller 11 to notify it of the coincidence of the count of the timer circuit with the predetermined value. In step S3, a query is made to see if the time measured by the timer 12 is equal to the predetermined time. If the response in step S3 is affirmative, the respective recording operations of the magnetic head 3 and the optical pickup 4 are interrupted in step S4. During interruption of the respective recording operations of the magnetic head 3 and the optical pickup 4, the respective current positions of the magnetic head 3 and the optical head 4, namely, address information representing the current address on the magnetooptical disk 1, are stored in the internal memory of the system controller 11. During interruption of the respective operations of the magnetic head 3 and the optical pickup 4, the A/D converter 18 continuously provides digital signals, the compression-expansion circuit 17 continuously, compresses the digital signals, and the compressed digital signals are continuously stored in the buffer memory 13. Consequently, digital data to be recorded on the magnetooptical disk 1 is produced continuously.

Upon interruption of the recording operation, the system controller 11 provides a control signal for driving the shifting motor 5 to make the optical pickup 4 search for the lead-in region of the magnetooptical disk 1, and then the newest TOC information stored in the TOC memory 20 is recorded in the lead-in region in step S5 by the cooperative action of the magnetic head 3 and the optical pickup 4. Upon completion of the recording of the TOC information, namely, when the response in step S6 is affirmative, the timer 12 is reset in step S7; that is, the count of the counter circuit of the timer 12 is cleared. If any command to stop the digital data recording operation has not been entered by operating the input device 16, namely, if the response in step S8 is negative, the magnetic head 3 and the optical pickup 4 are returned to the positions where they were when the recording operations were interrupted, represented by the address information stored in the internal memory of the system controller 11, and the routine returns to step S1. Subsequently, the digital data is read from the buffer memory 13 and the recording operation is resumed.

The routine is executed repeatedly until the recording operation is completed or a recording operation stop command is entered by operating the input device 16. When the recording operation is finished, the TOC information presently stored in the TOC memory 20, i.e. the last TOC information, is recorded in the lead-in region of the magnetooptical disk 1. The transmission rate at which the digital data to be recorded on the magnetooptical disk 1 is read from the buffer memory 13 is higher than the transmission rate at which the digital data is written in the buffer memory 13; for example, the former transmission rate is three times the latter transmission rate. Accordingly, the operation for recording the TOC information on the magnetooptical disk 1 does not obstruct the operation for writing the digital data to be recorded in the buffer memory 13.

When reproducing the digital data recorded on the magnetooptical disk 1, the input device 16 is operated to set the magnetooptical recording apparatus in reproducing mode. The system controller 11 actuates the servo system 6 for the controlled rotation of the spindle motor 2. Then, the shifting motor 5 moves the optical pickup 4 to a position corresponding to a reproduction starting position on the magnetooptical disk 1. Then, the system controller 11 makes the optical pickup 4 start reading the digital data recorded on the magnetooptical disk 1. The optical detector of the optical pickup 4 detects the reflected light from the magnetooptical disk 1 to reproduce the digital signals, and the optical pickup 4 supplies the reproduced signals to the RF amplifier 9, which in turn amplifies the reproduced signals. The reproduced signals amplified by the RF amplifier 9 are supplied to the address decoder 8. The address decoder 8 extracts address information from the reproduced signals and supplies it to the encoder/decoder 10. Meanwhile, error signals including a focusing error signal and a tracking error signal provided by the RF amplifier 9 are supplied to the servo system 6. Then, the servo system 6 controls the tracking and focusing operation of the optical pickup 4 and the rotation of the spindle motor 2 on the basis of the above error signals. The magnetooptical disk 1 is rotated at a fixed linear velocity. First, the optical pickup 4 is moved to the lead-in region of the magnetooptical disk 1 to read the TOC information recorded in the lead-in region and to store the TOC information in the TOC memory 20. The optical pickup 4 is then shifted radially across the magnetooptical disk 1 by the shifting motor 5 according to the TOC information in order to read the digital data from the magnetooptical disk 1. If the reproduced signals represent the TOC information recorded in the lead-in region of the magnetooptical disk 1, the encoder/decoder 10 subjects the TOC information to EFM demodulation and CIRC coding and stores the demodulated and coded TOC information in the TOC memory 20. If the reproduced signals represent the digital data recorded in the data region of the magnetooptical disk 1, the encoder/decoder 10 subjects the reproduced signals to EFM demodulation and CIRC decoding. The encoder/decoder 10 transmits the digital data at a transmission rate of 1.4 Mb/sec to the buffer memory controller 14. Then, the digital data is stored in the buffer memory 13 according to a write control signal provided by the buffer memory controller 14 until the amount of the digital data reaches a predetermined capacity of, for example, 1 Mb. The digital signals stored in the buffer memory 13 are read from the buffer memory 13 at a transmission rate of 300 kb/sec according to a read control signal provided by the buffer memory controller 14. During the read operation, the optical pickup 4 interrupts the reproducing operation and pauses at the same position on standby.

The digital signals read from the buffer memory 13 at a transmission rate of 300 kb/sec are expanded by the compression/expansion circuit 17 at a transmission rate of 1.4 Mb/sec. The expanded digital signals are converted into corresponding analog signals, i.e., audio signals, by the D/A converter 19 and the analog signals are applied to the output terminal 22. Even if track jump occurs due to flaws in the magnetooptical disk 1 or vibration of the magnetooptical disk 1 during the expansion of the digital signals stored in the buffer memory 13, the optical pickup 14 is restored to its correct position during the expansion of the digital signals, so that the sound can be reproduced without interruption.

The system controller 11 manages the TOC information stored in the TOC memory 20 so as to use the same for the search operation, and the TOC information is displayed on the display 15.

Although the invention has been described in its preferred form with a certain degree of particularity, obviously many changes and variations are possible. It is therefore to be understood that the present invention may be practiced otherwise than as specifically described herein without departing from the scope and spirit thereof.

What is claimed is:

1. A magnetooptical recording apparatus for recording data in a recording region of a magnetooptical recording medium and information representing contents of the recorded data in a lead-in region of the magnetooptical recording medium, said recording apparatus comprising:

a recording head for recording the data on the magnetooptical recording medium;

signal processing means for processing data supplied thereto and supplying the processed data to the recording head;

a timer for measuring a recording time in which the recording head records the data on the magnetooptical recording medium;

control means for controlling the recording head, wherein the control means interrupts a recording operation of the recording head for recording the data on the magnetooptical recording medium when the recording time measured by the timer coincides with a predetermined value, moves the recording head to the lead-in region of the magnetooptical recording medium, and causes the recording head to record information representing the contents of the data in the lead-in region of the magnetooptical recording medium;

first memory means for temporarily storing the data provided by the signal processing means, wherein the first memory means is controlled by the control means so that the data is read therefrom at a transmission rate higher than a transmission rate at which the data provided by the signal processing means is written therein; and second memory means for storing the information representing the contents of the data recorded in the recording region of the magnetooptical recording medium.

2. A magnetooptical recording apparatus for recording data in a recording region of a magnetooptical disk and information representing contents of the recorded data recorded in a lead-in region of the magnetooptical disk, said recording apparatus comprising:

an optical pickup disposed on one side of a substrate of the magnetooptical disk to irradiate the magnetooptical disk with a light beam;

a magnetic head disposed on an opposite side of the magnetooptical disk with respect to the optical pickup and moved radially across the magnetooptical disk together with the optical pickup to apply vertical magnetic fields corresponding to data to be recorded on the magnetooptical disk;

signal processing means for processing input data and supplying the processed data to the magnetic head;

a timer for measuring a recording time in which the optical pickup and the magnetic head record the data on the magnetooptical disk;

first memory means for temporarily storing the processed data provided by the signal processing means, and from which data stored therein is read out at a transmission rate higher than a transmission rate at which data is written therein;

control means for controlling the signal processing means and the first memory means, wherein the control means interrupts the respective recording operations of the magnetic head and the optical pickup, moves the magnetic head and the optical pickup to the lead-in region of the magnetooptical disk and causes the magnetic head and the optical pickup to record information representing the contents of the data recorded in the recording region of the disk in the lead-in region of the disk when the recording time measured by the timer coincides with a predetermined value; and second memory means for storing the information representing the contents of the data recorded in the recording region of the magnetooptical disk.

3. A magneto-optical recording apparatus for recording data in a recording region of a magneto-optical recording medium and information representing contents of the recorded data in a lead-in region of the magneto-optical recording medium, said recording apparatus comprising:

a recording head for recording the data on the magneto-optical recording medium;

signal processing means for processing data supplied thereto and supplying the processed data to the recording head;

timer means for measuring a recording time in which the recording head records the data on the magneto-optical recording medium;

control means for controlling the recording head, wherein the control means interrupts a recording operation of the recording head for recording the data on the magneto-optical recording medium when the recording time measured by the timer means coincides with a predetermined value, moves the recording head to the lead-in region of the magneto-optical recording medium, and causes the recording head to record information representing the contents of the data in the lead-in region of the magneto-optical recording medium; and memory means having first and second data storing sections, said first data storing section for temporarily storing the data provided by the signal processing means, wherein reading data from and writing data to said first data storing section is controlled by the control means so that the data is read therefrom at a transmission rate higher than a transmission rate at which the data provided by the signal processing means is written therein, said second data storing section for storing the information representing the contents of the data recorded in the recording region of the magneto-optical recording medium.

4. A magneto-optical recording apparatus for recording data in a recording region of a magneto-optical disk and information representing contents of the recorded data recorded in a lead-in region of the magneto-optical disk, said recording apparatus comprising:

an optical pickup disposed on one side of a substrate of the magneto-optical disk to irradiate the magneto-optical disk with a light beam;

a magnetic head disposed on an opposite side of the magneto-optical disk with respect to the optical pickup and moved radially across the magneto-optical disk together with the optical pickup to apply a vertical magnetic field corresponding to data to be recorded on the magneto-optical disk;

signal processing means for processing input data and supplying the processed data to the magnetic head;

timer means for measuring a recording time in which the optical pickup and the magnetic head record the data on the magneto-optical disk;

memory means having first and second data storing sections, said first data storing section for temporarily storing the processed data provided by the signal processing means, and from which data stored therein is read out at a transmission rate higher than a transmission rate at which the data is written therein, said second data storing section for storing the information representing the contents of the data recorded in the recording region of the magneto-optical disk; and control means for controlling the signal processing means and the reading of data from and the writing of data to the first data storing section of said memory means, wherein the control means interrupts the respective recording operations of the magnetic head and the optical pickup, moves the magnetic head and the optical pickup to the lead-in region of the magneto-optical disk and causes the magnetic head and the optical pickup to record information representing the contents of the data recorded in the recording region of the disk in the lead-in region of the disk when the recording time measured by the timer means coincides with a predetermined value.

* * * * *